I. HALDEMAN.
CLOTHES DRIER, &c.
No. 184,373.  Patented Nov. 14, 1876.
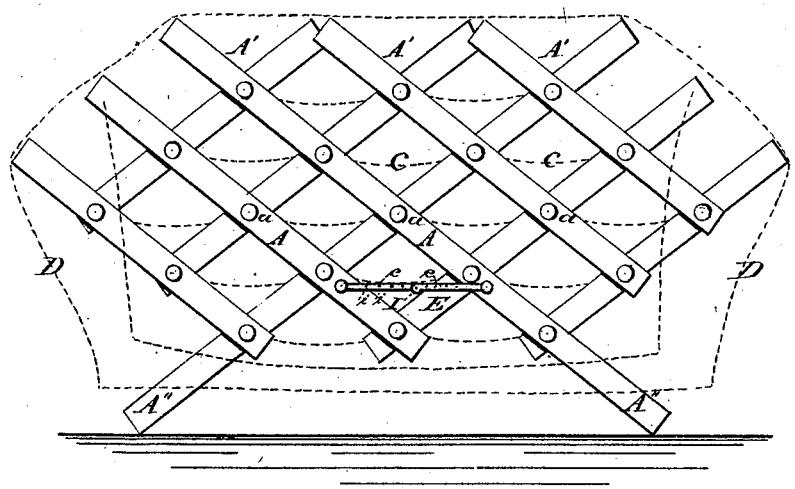
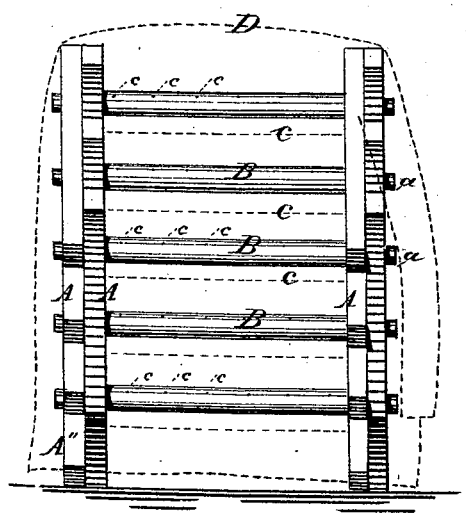
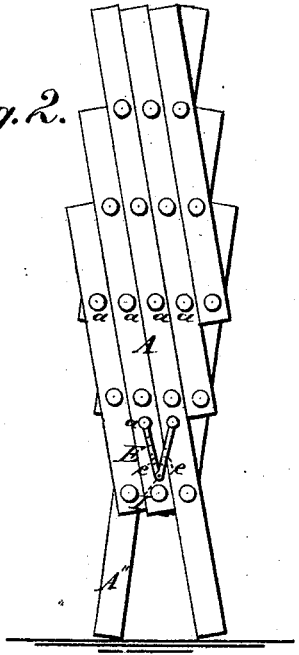

UNITED STATES PATENT OFFICE.

ISAAC HALDEMAN, OF WEST LIBERTY, IOWA.

IMPROVEMENT IN CLOTHES-DRIERS, &c.

Specification forming part of Letters Patent No. 184,373, dated November 14, 1876; application filed September 8, 1876.

*To all whom it may concern:*

Be it known that I, ISAAC HALDEMAN, of West Liberty, in the county of Muscatine, and State of Iowa, have invented certain new and useful Improvements in Frames for Drying Clothes, Fruits, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a side elevation of my improved frame, extended. Fig. 2 is a similar view of the same folded up, and Fig. 3 is a front elevation.

Similar letters of reference indicate corresponding parts in all the figures.

This invention consists in an arrangement of rods in tiers, so as to produce a series of shelves or drying-tables, and in the combination of the frame thus produced with flexible shelves, as hereinafter more fully shown and described.

In the drawing, A represents the side slats, pivoted together at *a*, upon the "lazy-tong" principle, so that they may be readily extended or folded up. The sides thus formed are united by rods denoted by B, the ends of the said rods forming the pivots *a*. These rods are arranged in sets or tiers one above the other, so that when the slats A are folded up, as shown in Fig. 2, they will form a series of shelves parallel to each other. To form these shelves it is not necessary to fold the sides A up altogether, but all that is required is to bring the rods B, which form the shelves, sufficiently near together to prevent the articles deposited upon them from falling down between them. When thus partially folded up, the frame affords a convenient clothes-press, permitting of a more perfect airing of the linen deposited upon the shelves than if these were solid.

The side slats A are extended up above the uppermost tier of rods so as to form supports denoted by A', for hats, caps, &c., when the device is used as a hall-rack. Four slats extend some distance below the lowermost tier, to form the legs A''.

C represents pieces of canvas or similar material, one for each tier of rods. Each piece of canvas is attached at its ends to the end rods of each tier, and is secured on its side between the rods by strings *c*. By this arrangement I form a series of canvas shelves, upon which fruit, vegetables, or grain may be deposited to dry in the sun, in the open air, as the apparatus may be readily folded up in damp or wet weather and carried inside without removing the fruit or grain from the drying-shelves, which will, when folded up, form pouches or bags depending from the rods B.

Having thus described my invention, I claim and desire to secure by Letters Patent of the United States—

The combination of the flexible shelves C, made of canvas or similar material, with the rods B arranged in tiers, and folding slats A, substantially as and for the purpose herein shown and specified.

In testimony that I claim the foregoing as my own I have hereto affixed my signature in the presence of two witnesses.

ISAAC HALDEMAN.

Witnesses:
   ISAAC HEALD,
   JONT. MAXSON.